Patented Mar. 29, 1932

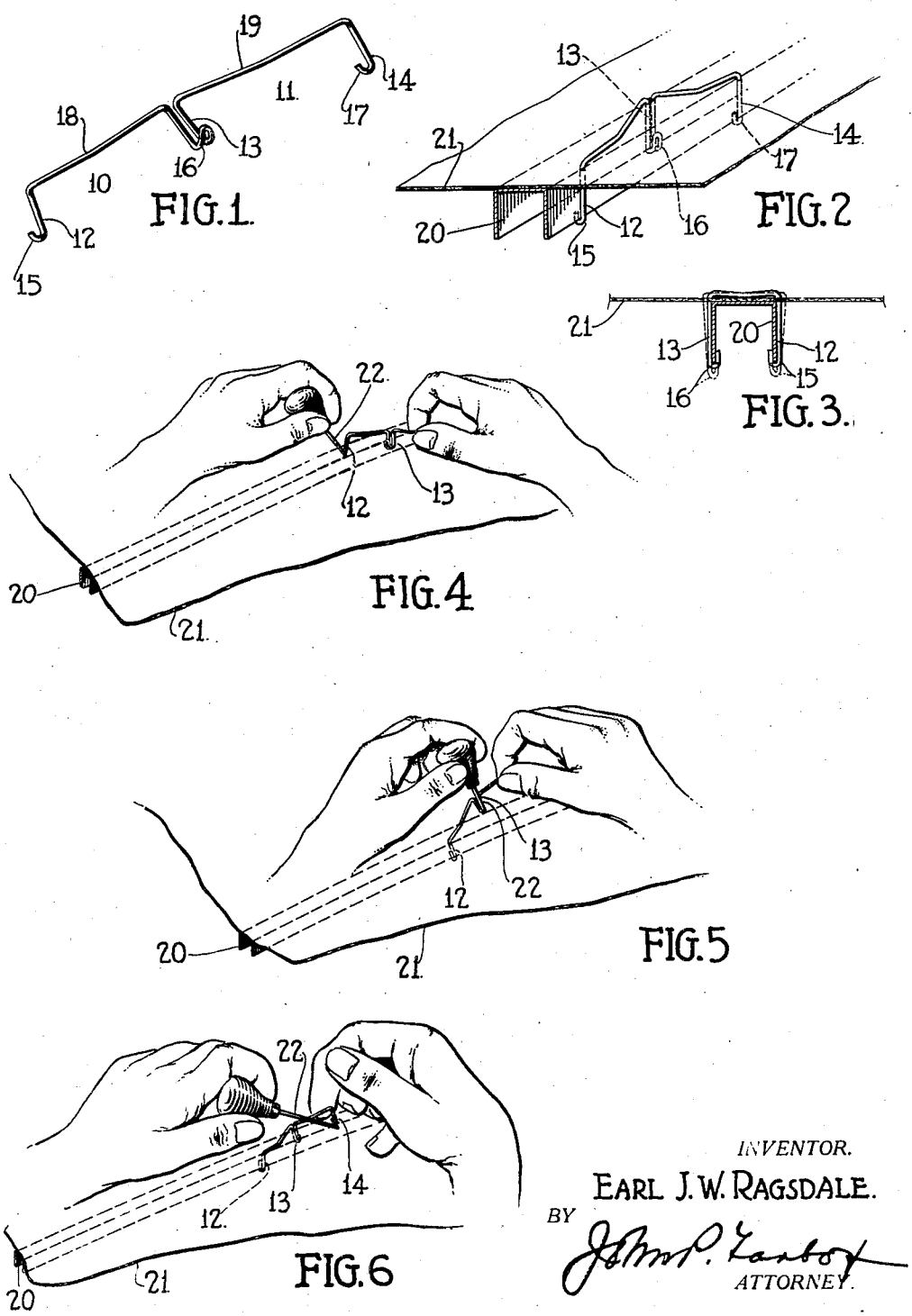

1,851,212

UNITED STATES PATENT OFFICE

EARL J. W. RAGSDALE, OF NORRISTOWN, PENNSYLVANIA, ASSIGNOR TO EDWARD G. BUDD MANUFACTURING COMPANY, OF PHILADELPHIA, PENNSYLVANIA, A CORPORATION OF PENNSYLVANIA

SECURING DEVICE FOR AIRCRAFT COVERINGS

Application filed December 21, 1929. Serial No. 415,662.

The surface covering fastening device of my invention is adapted to secure in place the coverings of aerofoils of all descriptions. Indeed it is adapted for securing in place the coverings of the frameworks of aircraft bodies in general, whether those frameworks be of aerofoil sections, fuselage or other, and whether the coverings be of organic or inorganic material, as for example, fabric or metal.

The invention has especial reference to the securing of fabric coverings to metal frameworks, particularly to angle cross section metal frameworks, but it is likewise adapted for securing fabrics to wooden frameworks to composite, (wooden and metal frameworks) etc. Indeed it has been the general practice to very laboriously sew fabrics onto the wings and control surfaces of airplanes by projecting long needles from the under side of these structures to the upper side on one side of a rib or truss section and then back again on the other, thereby uniting the fabric commonly to both sides of such member. This is a most time consuming operation and is subject to many objections as against the single advantage of general securement to the entire rib or truss.

It is a primary aim of my invention to save time and thereby cut the cost of attachment of coverings in general.

It is a further object of my invention to provide a stronger and more durable fastening means, for in time, the threads and cords used in sewing deteriorate as do all unprotected organic materials.

Yet further, it is an aim to provide a fastening means which is not subject to the stretching found in the cordage fastening means.

One other disadvantage of the cordage fastening means is to be found in the very commonly arising necessity of an overlying fastening adjuctive to the cordage fastening. This is usually in the form of an overlying tape which in many cases is itself secured directly to the frame member as well as to the loops of the cord which it overlies.

This and yet other ends and aims I attain by constructing the fastening device of my invention as a shank which may be thrust through the surface covering alongside of the frame member, and is provided on one end with a means adapted to engage under the aerofoil or other framework and on the other end with a resilient head adapted to bear on the exterior of the fabric, retain the same down upon the exterior of the framework and at the same time through the same resiliency hold the end of the shank in engagement with the framework. Passing over the broader features of my invention, it comprises a three legged double loop of continuous resilient wire stock, the intermediate leg being formed by a reverse bend of the stock, all three legs being reversely bent to provide hooks to engage under the edges of a channel sectioned metal frame member presenting inwardly of the aerofoil, and bights of the loops being bowed toward the ends of the legs and lying at an angle to each other, whereby the intermediate leg is adapted to engage under the edge of the channel section side wall on one side, the bights of the loops through their inwardly bowed bodies are adapted to engage upon the exterior of the surface covering, and the remote legs are adapted to project through the surface covering on the opposite side of the frame member and engage under the edges of the opposite side wall of the channel section frame member, the whole being resiliently held together through the resiliency of the stock as exercised through the bowed portions of the bights of the loops.

In the accompanying drawings this form of my invention is disclosed, but it is to be understood that it may take many other forms.

Fig. 1 is a general perspective view of the specific form just described.

Fig. 2 is a perspective showing of the application of the device to surface covering a framework.

Fig. 3 is a transverse cross section of the channeled cross sectioned member of the framework illsutrated in Fig. 2 showing one loop of the fastener.

Figs. 4, 5 and 6 are perspectives showing a number of convenient methods of application known to me.

The material I use is a rustless steel whereby there is no deterioration of fastening or of covering by fastening.

The double loops are designated in general 10 and 11, the three legs or shanks of the loop 12, 13 and 14, respectively, their reversely bent hook ends 15, 16 and 17 respectively, and the bights or heads of the loops 18 and 19. The channel cross sectioned metallic frame member referred to is designated 20, and its surface covering 21.

The stock used for the double loop fastening device of Fig. 1, is resilient wire stock. The middle leg or shank 13 of the device is formed by reversely bending the middle portion of the stock. The hook 16 of this middle leg is formed by reversely bending the extremity of this bend. Its arms are bent to adjoin or lie closely adjacent to each other so that they together constitute a single leg of the clip. The ends of the other legs 12 and 13 constitute the ends of the stock itself and are simply reversely bent in the manner shown. The bends in all cases are on a relatively small radius, and are of broader dimensional relation to the thickness of the side walls of the channel member 20 whereby they may hook under its edges with certainty and facility. The bights 18, 19 of the loops 10 and 11 are bowed inwardly toward the ends of the shanks 12 to 14, as clearly appears in both Figs. 1 and 2. They are arranged at an angle to each other as most clearly appears in Fig. 2. From another view the planes of the two loops 10 and 11 are at an angle to each other. Thereby, leg 13 may lie on one side of the frame member 20 and the remote legs 12 and 14 may lie on the opposite side.

In the assemblage, as shown in Fig. 2, the intermediate leg 13 is projected through the covering 20 on one side of the channel section frame member 20 and hooked under the edge of that side wall, while the two remote legs 12 and 14 are projected through the fabric, past the other side of the frame member 20 and hooked on the edge of that side wall. The bights 18 and 19 of the loops through the bow provided in them engage the exterior of the covering 21 and through the resiliency of the stock as exercised through the bow not only hold the fabric in firm engagement with the framework 20, but also hold the hooks 15, 16 and 17 outwardly and firmly hooked over the inwardly presented edges of the channel cross section member 20.

The attachment of fabric by this device and method is believed by me the simplest device known. The fabric is pierced to successively receive the edge of the shanks 12, 13 and 14, placement of the clip and insertion of the legs being by hand. The moment each of the shanks is entered the clips are pressed firmly down by hand or by a flat block, bearing particularly on the upper ends of the shanks 12 to 14, whereby the bows of the bights 18 and 19 are sprung and the hooked ends project past the edges of the side walls of the channel cross section 20, and the pressure is then relieved, whereupon the hooked ends are sprung upwardly by the bights 18 and 19 and hook over the edges. To facilitate the engagement under the side walls of the channel 20, the shanks 12 to 14 are slightly converged at their ends as clearly appears in the dotted lines of Fig. 3, (or the intermediate leg may be resiliently positioned closer to the plane of the remote legs than the width of the frame member,) whereby their hooked ends are resiliently borne against the side walls of the frame member as they are projected downwardly and are snapped into place underneath the edges of its side walls. Such resiliency is provided jointly by the bights 19 and by the torsional resiliency of the double leg shank 13, and in the fabric coverings this is assisted by the resiliency of the stretched fabric, the entry of the shanks being made close up the side walls of the frame member, with the joint result that the moment the hooks 15 to 17 are depressed below the edges of the channel section side walls they snap under, and the shanks themselves are drawn close up against the side walls as shown in Fig. 2.

The terminology of the annexed claims by which I endeavor to define my invention is of course circumstantial, and the real definition of the invention and its generic spirit is defined by the prior art.

What I claim is:

1. A surface covering fastener for aircraft parts comprising a wire loop, the ends of which are reversely bent and adapted to hook under the aircraft part frame work and the bight of which is offset intermediate its ends toward the plane of the reversely bent ends of the loop and adapted to bear resiliently upon the surface covering overlying the framework.

2. A surface covering fastener for aircraft parts comprising a U-shaped clip, the arms of which are provided with hooked ends adapted to engage under the aircraft part framework and the bight of which is resilient and offset intermediate the arms to engage the exterior of the surface covering, the bight being adapted to be sprung in the application of the fastener to effect the engagement of the arms and to hold them in place after engagement by its resiliency.

3. A surface covering fastener for aircraft parts comprising a pair of shanks adapted to be passed through the covering and resiliently connected together by means offset to engage the covering intermediate the shanks and having means on their ends to engage under the aircraft part framework, the resilient connection permitting the fastener to be sprung into operative relation to the framework and held in such relation by its resilience.

4. A surface covering fastener for aircraft parts comprising a shank having means on one end to project through the covering and engage under the aircraft part framework, and means on the other end offset remote from said shank to engage the surface covering exteriorly, said second means being resilient, whereby to permit the fastener to be sprung into place and locked by its resilience.

5. A surface covering fastening device for aircraft parts comprising a three legged clip, the legs of which are provided on their lower ends with means to engage under the aircraft part framework, and means connecting their upper ends adapted to engage the exterior of the surface covering, the clip being resilient to permit springing the end and intermediate legs respectively into engagement with opposite sides of the frame member.

6. A surface covering fastening for aircraft parts comprising a double U-shaped clip having two legs, the ends of which legs are provided with means to engage under the aircraft part framework, and the bights of which lie at an angle to each other and are adapted to engage the exterior surface of the covering, whereby the adjoining legs may engage on one side of the framework member and the remote legs may engage at separated points on the other side of the frame member.

7. A surface covering fastening for aircraft parts comprising a three legged U-shaped spring wire clip of continuous stock, the middle leg of which is formed by a Dutch bend of the stock, having the ends of all legs reversely bent to form hooks adapted to engage under the aircraft part framework, and having the bights of the loop bowed toward the hooked ends, whereby to resiliently retain the hooked ends in engagement with the framework.

8. In combination, a channel shaped aircraft part framework comprising a frame member presenting inwardly of the aircraft part and covering therefor, and a U-shaped clip retaining the covering in place, and comprising arms having ends hooked under the edges of the channel section side walls, and a bight inwardly offset intermediate its ends and resiliently bearing upon the surface covering and retaining the hooked ends in engagement with the edges of the channel section side walls.

In testimony whereof I hereunto affix my signature.

EARL J. W. RAGSDALE.